United States Patent [19]

Eckardt et al.

[11] Patent Number: 4,739,586
[45] Date of Patent: Apr. 26, 1988

[54] METHOD OF AND APPARATUS FOR EDGE GRINDING GLASS PANES

[75] Inventors: Rudolf Eckardt; Hans C. Neuendorf; Horst Spittka, all of Wesel, Fed. Rep. of Germany

[73] Assignee: Flachglass Aktiengesellschaft, Furth, Fed. Rep. of Germany

[21] Appl. No.: 757,620

[22] Filed: Jul. 22, 1985

[30] Foreign Application Priority Data

Jul. 20, 1984 [DE] Fed. Rep. of Germany ....... 3426744

[51] Int. Cl.⁴ .................................. B24B 9/08
[52] U.S. Cl. .................................. 51/105 R; 51/283 E;
51/105 EC; 51/165.76; 51/267
[58] Field of Search ............. 51/105 R, 283 E, 283 R, 51/105 EC, 267, 266, 165 R, 165.67

[56] References Cited

U.S. PATENT DOCUMENTS 2,080,280  5/1937  Klages ........................... 51/105 EC
3,543,451 12/1970  Smith ................................. 51/267
4,528,780  7/1985  Halberschmidt ................. 51/283 E

FOREIGN PATENT DOCUMENTS 0071541  9/1983  European Pat. Off. .
2817397 10/1978  Fed. Rep. of Germany .
3126257 12/1982  Fed. Rep. of Germany .

Primary Examiner—Robert P. Olszewski
Assistant Examiner—Maurina Rachuba
Attorney, Agent, or Firm—Karl F. Ross; Herbert Dubno

[57] ABSTRACT

Method and apparatus for the edge grinding of a glass pane in which a grinding wheel is guided to the glass pane so that a grinding point is defined therebetween which travels along the edge of the rotating wheel. Cooling during grinding is provided by a coolant jet dispensed from a nozzle whose end is essentially pointed towards the grinding point. Via a respective control unit, the coolant jet is caused to follow automatically and precisely the movement of the grinding point.

5 Claims, 2 Drawing Sheets

METHOD OF AND APPARATUS FOR EDGE GRINDING GLASS PANES

FIELD OF THE INVENTION

Our present invention relates to a method of and to an apparatus for the edge grinding of glass panes.

BACKGROUND OF THE INVENTION

Methods and apparatus for the edge grinding of non-circluar glass panes generally make use of a rotating grinding wheel—usually a diamond wheel—which is brought into contact with the glass pane. The grinding point between the wheel and the glass pane travels along the edge of the rotating wheel while a coolant jet is directed tangentially onto the grinding wheel to provide the cooling effect. The grinding wheel is supported on a spindle whose spindle arm is connected to an automatic control unit to adjust the position of the grinding wheel with respect to the glass pane.

Such an apparatus is known in various designs, e.g. from the German publication DE-OS No. 28 17 397 or European patent EP-A No. 00 71 541. A main concern in such an apparatus is a proper cooling as it affects the service life of the grinding wheel as well as the quality of the grinding process.

A device for supplying a coolant is known in practice which includes a circularly bent pipe connected to a distributor box. For discharging the coolant, the pipe and the distributor box are provided with a plurality of nozzle bores or inserted nozzles, not all of which are directed tangentially towards the grinding wheel.

The cooling effect provided with such a device has proven to be unsatisfactory. Especially when the grinding point travels in a manner as previously mentioned, the cooling effect deteriorates considerably as the coolant jet will not sufficiently be directed towards the grinding point. By increasing the amount of injected coolant, the cooling effect may somewhat be improved, however, such increase is generally not desired because of e.g. economical reasons.

OBJECT OF THE INVENTION

It is thus the principal object of our present invention to provide an improved method and improved apparatus for grinding the edges of glass panes obviating the afore-stated drawbacks.

SUMMARY OF THE INVENTION

We realize this object in accordance with the present invention by directing the coolant jet essentially towards the grinding point as defined between the grinding wheel and the glass pane and to provide a control unit to allow the coolant jet to follow the movement of the grinding point.

According to the invention, the supply of coolant is provided by means of a nozzle holder which is supported by the spindle and pivotable about the axis thereof. The nozzle holder which carries a nozzle pointed generally tangentially towards the grinding point into the groove between the grinding wheel and the glass pane is operatively connected to a control unit which causes the nozzle holder and thus the nozzle to follow exactly the movement of the grinding point.

The term "generally tangentially" is intended to mean tangential to a circle centered on the wheel axis and this can mean tangential to the periphery of the wheel or secantially.

Through directing the coolant jet into the groove or crevice defined by the wheel and the pane where the two meet towards the grinding point, an intensive cooling is obtained.

Although known per se from the German publication No. 31 26 257, this cooling effect could not be effectively utilized when the grinding of edges of glass panes was concerned.

The invention is based upon my surprising discovery that by adjusting the nozzle holder in dependence on the movement of the grinding point, the coolant jet is continuously and accurately directed into the groove so that even with a relatively small amount of coolant a satisfactory cooling is obtained.

Preferably, the connection between the control unit and the nozzle holder is provided via a gear wheel to which the holder is connected and which is supported by the spindle. Cooperating with the gear wheel is a pinion which is driven by a servomotor actuated by the control unit.

BRIEF DESCRIPTION OF THE DRAWING

The above and other objects, features and advantages of our present invention will now be described in more detail with reference to the accompanying drawing, in which.

SPECIFIC DESCRIPTION

Figure 1:
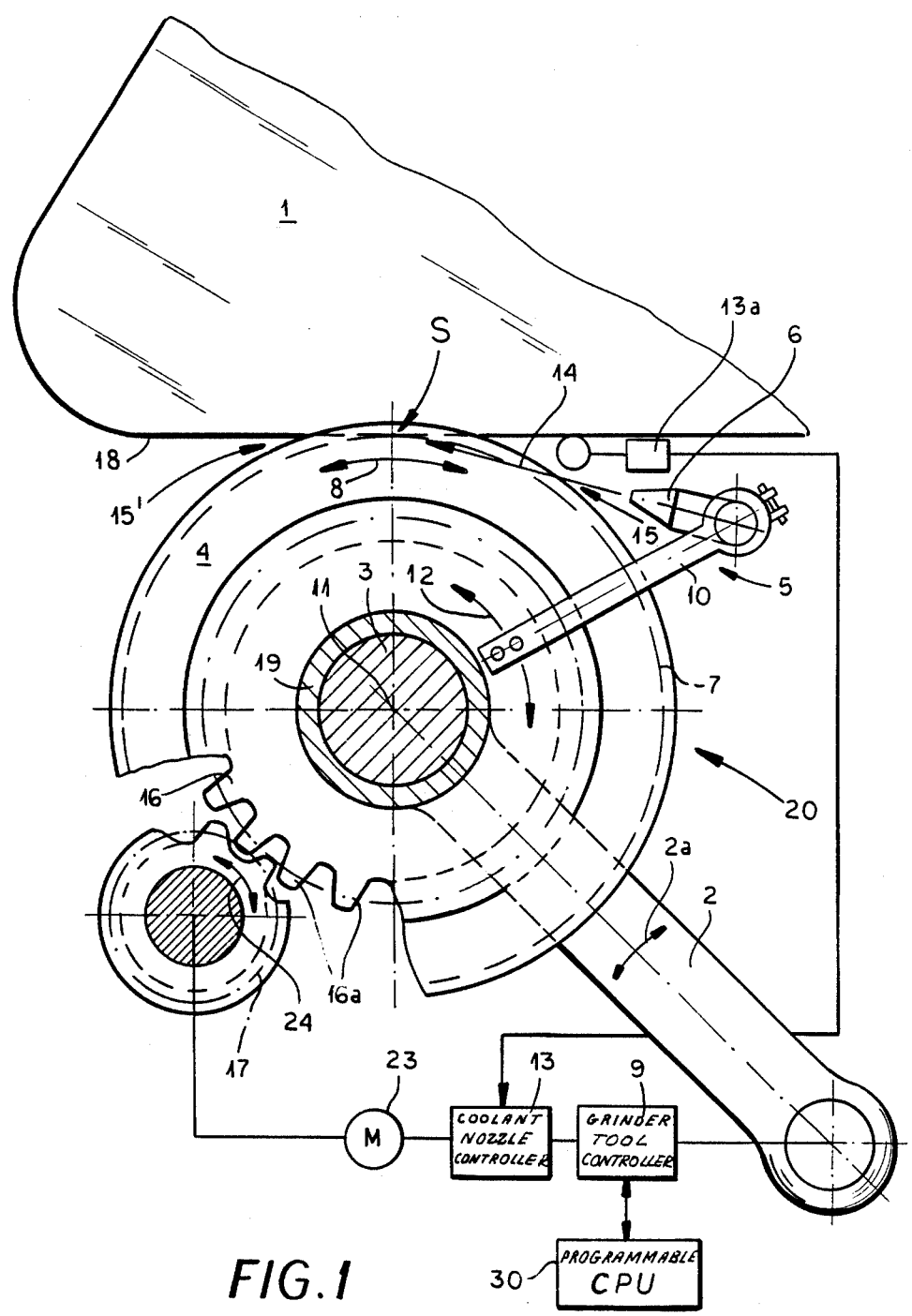
FIG. 1 is a top view of a portion of an apparatus according to the invention.
Figure 2:
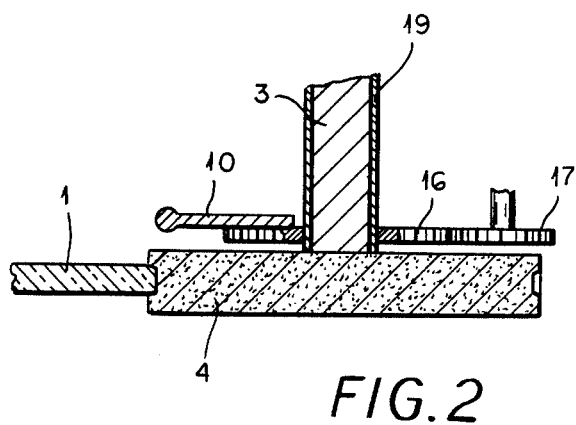
FIG. 2 is a cross-sectional view of the apparatus of FIG. 1.

In the drawing we have shown a glass pane 1 whose edge 18 is to be ground by a surface grinding apparatus generally designated by reference numeral 20. The grinding apparatus 20 is provided with a spindle 3 whose axis 11 extends vertically and is driven by conventional means, e.g. by an electromotor (not shown) and respective belts (not shown). The grinding spindle 3 is supported in a sleeve 19 and bears a rotatable circulating (diamond) grinding wheel 4 which has abrasive material bonded to its surface or in a binder matrix.

Cooperating with the spindle 3 is a spindle arm 2 which is operatively connected to an automatic control unit 9 to adjust the wheel 4 in its position with respect to the glass pane 1 in dependence on the geometry and edge contour of the glass pane 1 by being swivable in direction of double arrow 2a. The grinding point S thus defined between the glass pane 1 and the wheel 4 travels along the edge 7 (indicated by broken line 7) of the wheel 4 on a working arc as indicated by double arrow 8 during rotation of the grinding wheel 4.

According to the invention, a pointed coolant jet is injected towards the grinding point S during the entire grinding process. This is achieved by providing the grinding apparatus 20 with an injection unit 5 which directs a coolant jet 14 into the groove 15 defined between the wheel 4 and the glass pane 1 and towards the grinding point S. The injection unit 5 includes a nozzle 6 whose end is directed tangentially with respect to the wheel 4 so that the coolant jet 14 extends tangentially towards the grinding point S on the working arc 8.

The nozzle 6 is connected at an angle to one end of an arm-like nozzle holder 10 in a pivotable manner so as to be adjustable relative to the grinding point S. The other end of the nozzle holder 10 is supported by the spindle 3 such that the holder 10 and the nozzle 6 are pivotable about the axis 11 as indicated by double arrow 12. For reasons of simplicity, the supply of coolant from a source through the nozzle holder 10 and to the nozzle 6 is not illustrated in detail.

The nozzle holder 10 is connected to a gear wheel 16 which is supported by the spindle 3 and is provided with circumferential teeth 16a. In the present embodiment, the nozzle holder 10 extends radially to the working arc 8 and thus to the gear wheel 16. It is, however, also possible to have the holder 10 extending in a secantial manner, i.e. intersecting the periphery of the gear 16 at two points.

Cooperating with the gear 16 is a pinion 17 whose teeth 17a mesh with the teeth 16a of the gear 16 and which is operatively connected to a servomotor 23 of a control unit 13. The control unit 13 is preferably coupled with the control unit 9 in order to guide the nozzle 6 in accordance with the movement of the spindle arm 2 so that the coolant jet 14 is continuously discharged from the nozzle 6 into the groove 15 towards the grinding point S.

During operation, the control unit 13 causes the pinion 17 to be rotated via the servomotor 23 in either direction of arrow 24 in dependence on the actuation of the spindle arm 2 thereby pivoting the nozzle holder 10 about the spindle axis 11. The nozzle 6 follows thus the movement of the respective grinding point S and directs a coolant jet 14 continuously towards the point S into the groove 15. Through the radial extension of the nozzle holder 10 with respect to the gear 16 and the working arc 8, the coolant jet 14 is accurately directed into the groove 15 during the automatic adjustment of the nozzle 6.

It is to be understood that the invention is not limited to the use of only one nozzle arm 10 provided with a nozzle 6 which directs a coolant jet 14 into the groove 15 towards the grinding point S. Rather, the grinding apparatus 20 may also be provided with two such nozzle arms 10 which inject a coolant jet 14 into the groove 15 as well as into the groove 15' which are arranged at both sides of the grinding point S between the glass pane 1 and the grinding wheel 4. The coolant is injected in a fine jet so that a relatively limited quantity of coolant is required.

As control unit 13, a sensing device 13a may be used which contacts the edge 18 of the glass pane 1 and controls the pinion 17 and the nozzle 6 in dependence on the surface of the pane edge 18. Preferably, a program control unit is used which couples the control unit 13 and the control unit 9 so as to control the grinding process in its entirety. For reasons of simplicity, the control units 9 and 13 have only been indicated in form of a block diagram and thus are not illustrated in detail.

In addition, we may employ a learning computer 30 which stores the values as obtained for a certain model glass pane during a first grinding process in which the nozzle holder 10 and the nozzle 6 are manually controlled so that the so-stored values can be used to grind automatically similar glass panes during succeeding grinding processes.

We claim:

1. An apparatus for edge grinding a glass pane, comprising:
    a circulating grinding wheel;
    first control means for guiding the grinding wheel towards the glass pane such that a grinding point is defined therebetween which travels along the edge of said grinding wheel on a working arc during operation of the latter, said first control means including a spindle defining an axis and supporting said grinding wheel, a spindle arm connected to said spindle and a control unit cooperating with said spindle arm so that said grinding wheel is positioned with respect to the glass pane in dependence on the geometry of the latter ;
    cooling means for injecting a coolant jet tangentially with respect to said grinding wheel towards said grinding point, said cooling means including a nozzle holder supported by said spindle and being pivotable about said axis of said spindle, said nozzle holder including a nozzle with its end directed towards said grinding point; and
    second control means for adjusting the direction of the coolant jet in dependence on the movement of said grinding point, said second control means including a coolant control unit which is operatively connected to said nozzle holder so as to cause the latter to be moved in dependence on the movement of said grinding point, said coolant control unit being provided with a servomotor, said second control means further including a gear wheel supported by said spindle and connected to said nozzle holder and a pinion which engages said gear wheel and is actuated by said servomotor of said coolant control unit.

2. An apparatus as defined in claim 1 wherein said nozzle holder extends radially with respect to said working arc.

3. An apparatus as defined in claim 1 wherein said coolant control unit is a sensing device contacting the edge of said glass pane.

4. An apparatus as defined in claim 1 wherein said coolant control unit is a program control unit.

5. An apparatus as defined in claim 1, further comprising linkage means for coupling said first control means with said second control means.

* * * * *